(12) United States Patent
Martinez

(10) Patent No.: US 8,156,988 B2
(45) Date of Patent: Apr. 17, 2012

(54) FIBER STRIP MULTIAPPLICATOR HEAD AND METHOD FOR APPLYING THE FIBER STRIPS

(76) Inventor: Manuel Torres Martinez, Pamplona (ES)

( * ) Notice: Subject to any disclaimer, the term of this patent is extended or adjusted under 35 U.S.C. 154(b) by 987 days.

(21) Appl. No.: 11/658,456

(22) PCT Filed: Jul. 20, 2005

(86) PCT No.: PCT/ES2005/000408
§ 371 (c)(1),
(2), (4) Date: Jan. 26, 2007

(87) PCT Pub. No.: WO2006/021601
PCT Pub. Date: Mar. 2, 2006

(65) Prior Publication Data
US 2007/0234907 A1    Oct. 11, 2007

(30) Foreign Application Priority Data
Jul. 27, 2004   (ES) .................................. 200401853

(51) Int. Cl.
*B32B 38/04* (2006.01)
*B32B 38/00* (2006.01)
(52) U.S. Cl. ........ 156/517; 156/510; 156/511; 156/516; 156/252; 156/256

(58) Field of Classification Search .................. 156/250, 156/252, 256, 350–352, 510, 511, 516, 517; 100/6
See application file for complete search history.

(56) References Cited

U.S. PATENT DOCUMENTS

| 5,045,147 | A | * | 9/1991 | Benson et al. ................ 156/429 |
| 5,110,395 | A | * | 5/1992 | Vaniglia ....................... 156/353 |
| 5,273,614 | A | * | 12/1993 | Grimshaw et al. ............ 156/433 |
| 6,096,164 | A | | 8/2000 | Benson et al. |
| 2003/0171447 | A1 | * | 9/2003 | Torres Martinez ............. 522/75 |
| 2004/0098852 | A1 | * | 5/2004 | Nelson ........................... 29/428 |

FOREIGN PATENT DOCUMENTS

| EP | 1 342 555 A1 | 9/2003 |
| WO | 99/22932 | 5/1999 |
| WO | 02/070232 A1 | 9/2002 |

OTHER PUBLICATIONS

Certified Copy of Foreign Priority Application- PCT/ES05/000408.*

* cited by examiner

*Primary Examiner* — Mark A Osele
*Assistant Examiner* — Christopher C Caillouet
(74) *Attorney, Agent, or Firm* — The Nath Law Group

(57) ABSTRACT

The invention relates to a fiber strip multiapplicator head of the type supplying multiple independent application strips, to be compacted jointly in an area (2) by means of a roller of flexible material, the independent strips being led through hollows defined by the structural formation of a body (3) in the sides of which assemblies are arranged, which assemblies comprise respective master rollers (4) for pulling the strips synchronized with the respective cutting systems (5).

6 Claims, 6 Drawing Sheets

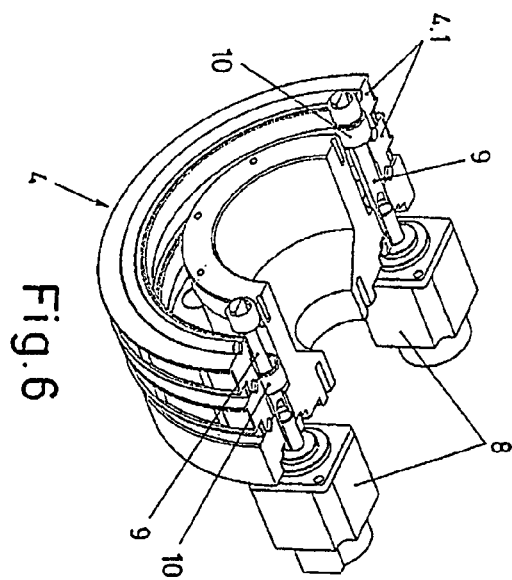
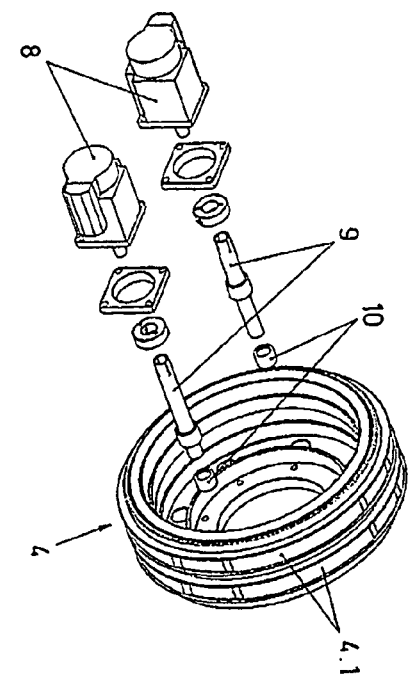
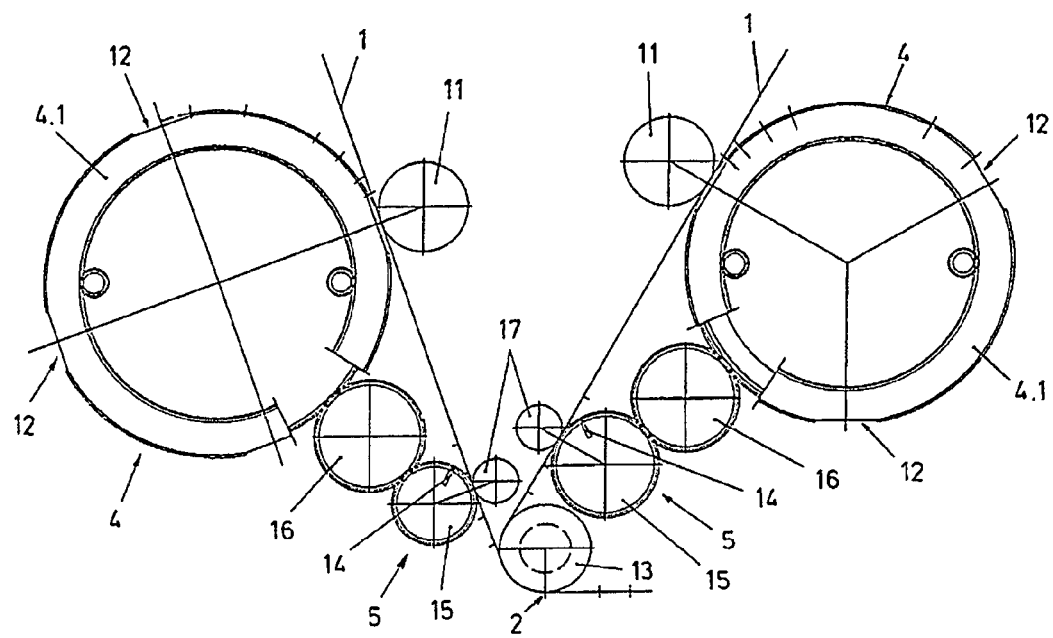

FIBER STRIP MULTIAPPLICATOR HEAD AND METHOD FOR APPLYING THE FIBER STRIPS

FIELD OF THE ART

The present invention relates to the application of carbon fiber strips, glass fiber strips or the like for the formation of laminar parts, proposing a head for said function provided with means optimizing the functional behavior for the mentioned application, as well as a method for carrying out this application.

STATE OF THE ART

In aeronautical, aeolian, naval and other constructions, laminar parts formed by the compact overlapping of layers of the so-called composites are normally used, being structured with carbon fiber or glass fiber strips which are applied by means of heads developed for that purpose.

U.S. Pat. No. 4,696,707 of The Ingersol Milling Machine Company, as well as European Patent EP 0 333 010 of Cincinnati Milacon Inc and Spanish Patents ES 9302506 and ES 9402102 of the same applicant of the present invention, among others, refer to this type of heads.

Said heads carry out the application of a strip or web of the corresponding material, repeating the application successively in a side progression until the entire width of the surface to be formed is covered, for which the strips or bands which are applied can be wide, for the purpose of covering the entire surface with a minimum number of runs, having the drawback that it is necessary to waste a large amount of material in the cuts for shaping the edges of the laminar parts, especially when said edges are oblique or irregular.

Strips with a small width can be used instead, whereby the waste material is reduced because the individual adjustment of the length of the used strips allows a better adaptation in the ends with respect to the edges, and therefore the shaping cut required is smaller, but on the other hand, with this solution the number of runs necessary to cover the entire application surface is greater, therefore the work time increase and the efficiency decreases.

Multiapplicator heads have been developed to solve the problem, such as the one of Spanish Patent ES 200200524 of this same applicant, such that a series of strips with a small width are applied jointly in each run, with which strips as a whole a considerable application width is determined, the contribution of the supplied strips being independent of the others, which allows starting and ending the application of each strip as required, thus being able to make the cuts for shaping the edges of the parts, like the hollows existing therein, by means of the interruption of the corresponding strips when necessary, whereby the process occurs with little waste of material.

This solution of the joint application of multiple strips requires in such case the combination with a cutting system which allows making the selective individual cut of the specific strips at the time when they have to be interrupted, for which a perfect synchronization between the cutting system actuation and the circulation movement of the strips towards the application area is necessary.

OBJECT OF THE INVENTION

According to the present invention, improvements in the embodiment of the mentioned heads for the simultaneous application of multiple fiber strips are proposed, achieving features that make the function of said heads in their application more advantageous.

The head of the invention comprises a reel-holder in which multiple spools supplying the fiber strips to be applied are incorporated, which fiber strips are led separately to an application area, where they are projected occupying a joint band between all of them, being compacted by means of a pressure system acting on the strips in said area, whereas before the application area there is a selective strip cutting system incorporated.

The pressure system on the strips in the application area consists of a roller of flexible material capable of adapting to the surface to be taped, said roller being actuated by two cylinders exerting a floating pressure, thus achieving a perfectly uniform application of the fiber strips.

In the head, the rollers serving as a guiding for the fiber strips are distributed by pairs in respective side assemblies, from which the corresponding strips pass by the sides of a leading body, going in relation to those functional respective side assemblies, each of which incorporates a master roller for dragging the fiber strips and a fiber strip cutting system.

The mentioned side assemblies can be moved towards the outside independently, thus facilitating the maintenance and cleaning operations, as well as the threading of the fiber strips through the corresponding leading passages towards the application area.

The body of the head is formed by a structural formation of parallel sheets with intermediate dividers, determining hollow spaces between the component sheets, through which the fiber strips are guided in their supply towards the application area. The dividers included between the sheets have holes through which an injection of air acting as lubricant occurs, reducing the friction of the strips in the leading hollows.

The cutting systems integrated in the side assemblies correspond in an individual operative manner to the path of the different fiber strips towards the application area, allowing to cut each of the strips selectively when it is necessary to interrupt their application.

To that end cutting systems provided with blades accompanying the longitudinal movement of the corresponding strips during the cutting action are foreseen, which blades are arranged in rotating supports provided with one or more blades, in correspondence with the respective areas for the passage of the different fiber strips, said blade-carrying supports having a rotating movement synchronized with the movement of the corresponding fibers strips, which allows making the cuts accurately.

The master rollers of the side assemblies are formed by a pack of rings which are assembled with movement and actuation of individual rotation, such that each of said rings can actuate the pulling for moving one of the fiber strips by trapping it against a dolly roller, the respective cutting systems for the different strips being individually synchronized with those rings by means of gearing or any mechanical, hydraulic, electromagnetic or any other type of method allowing to carry out said function.

The mentioned rings of the master rollers have in the periphery recesses which allow leaving the fiber strips free when they are facing the dolly roller, such that by means of a computer control of the operation, during the normal supplying process towards the application area the fiber strips are free from the action of the mentioned master rollers and when a cut has to occur, the ring of the corresponding master roller is actuated in an angular rotation, carrying out the trapping and pulling of the strip to be cut at the same time that it makes the corresponding cutting system rotate, whereby a completely accurate cut is obtained, keeping the fiber strip secured while the necessary pulling movement thereof is carried out, which allows carrying out the cutting and restarting processes of the fiber strips in a synchronized manner and without reducing the programmed speed.

The method for applying the fiber strips with the mentioned head is also the object of the present invention, such that starting from the position in which the tape moves freely forward through the head towards the compacting roller, the master roller is accelerated until reaching the synchronism speed with the forward movement of the tape, at which time the master roller traps the tape according to its larger diameter in this area, and with tape thus trapped by the master roller, the synchronized movement of the cutting mechanism cuts the tape, the deceleration then occurring until the forward movement of the part of the tape trapped by the master roller is stopped. Once this situation is reached, the restarting of the tape occurs by accelerating the master roller with the trapped tape, until reaching the speed of the forward movement of the head on the application surface, dispensing tape at said speed until the contact thereof with the compacting element, plus a safety distance for ensuring the correct adherence of the end of the tape to the application surface, after which the master roller releases the tape according to its smaller diameter in the corresponding area in this phase and decelerates until it stops, allowing the tape to move forward freely through the head.

Due to the foregoing, the results of said object of the invention are truly advantageous features, acquiring feasibility and a preferred character with respect to the known heads with the same function.

DESCRIPTION OF THE DRAWINGS

FIG. 5 shows an exploded perspective view of the actuation system of a master roller assembly formed by two independent rings.

FIG. 6 shows a sectioned perspective view of the same previous master roller assembly assembled.

FIG. 7 shows a schematic representation of the functional assembly of the head.

DETAILED DESCRIPTION OF THE INVENTION

Figure 1:
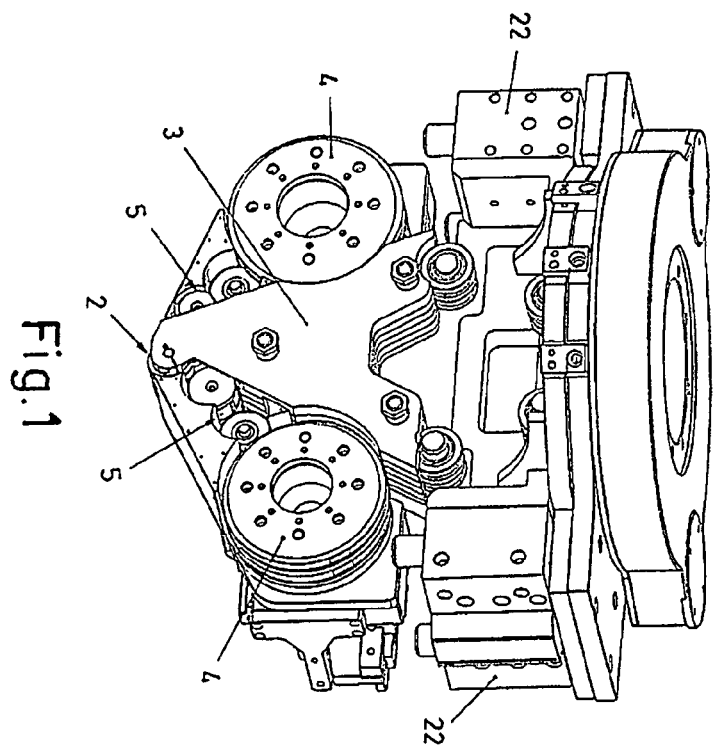
FIG. 1 shows a front perspective view of the proposed head.

The object of the invention relates to a head intended for the formation of laminar parts by means of carbon fiber strips, glass fiber strips or other similar ones, which are applied as a multiple group forming application bands, proposing peculiarities in the embodiment of said invention which improve the functionality thereof.

The head (23) of the invention is arranged in combination with one or more reel-holders (24), in which the spools supplying the fiber strips (1) to be applied are incorporated, which fiber strips are led separately towards the application area (2), where they are supplied jointly forming an application web on the surface (25) of the part to be formed.

In the practical arrangement, the reels supplying the fiber strips (1) are arranged in pairs in respective side assemblies, the strips (1) being led by the sides of the body (3) of the applicator head, where respective side assemblies are incorporated, which side assemblies are formed by a master roller (4) that can carry out the pulling of the corresponding strips (1) towards the application area (2), and a cutting system (5), by means of which the individual selective cut of the strips (1) can be carried out to interrupt the application thereof in the corresponding parts.

Figure 2:
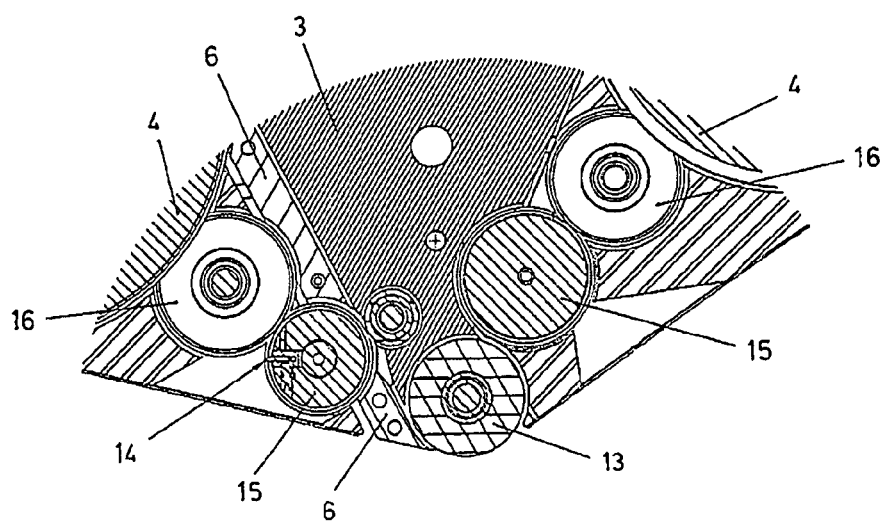
FIG. 2 shows a sectional detail of the part of the head including the cutting areas and the application area of the fiber strips.
Figure 3:
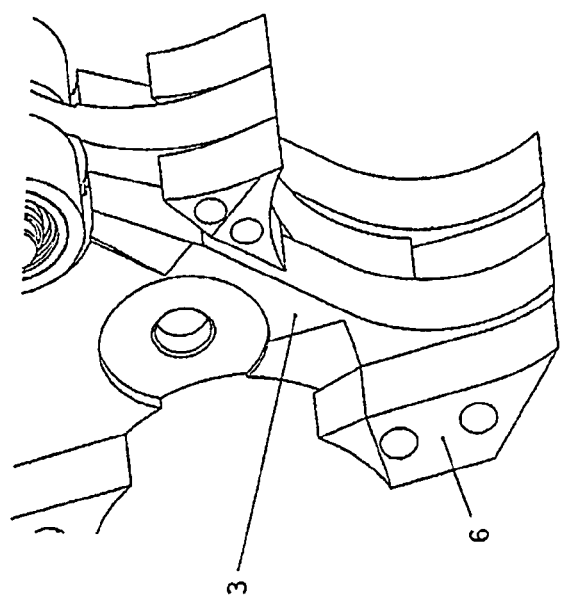
FIG. 3 shows a perspective detail of the part of the body of the head intended to incorporate one of the cutting systems.

The body (3) of the head is formed by a structural formation of parallel sheets, including dividers (6) between the component sheets, as shown in FIGS. 2 and 3, such that between said component sheets of the body (3) there are hollow spaces, through which the fiber strips (1) are led separately in the path towards the application area (2).

The dividers (6) are provided with holes, such that through them, an injection of air acting as lubricant occurs, reducing the friction of the strips in the passage through the leading hollows.

Figure 4:
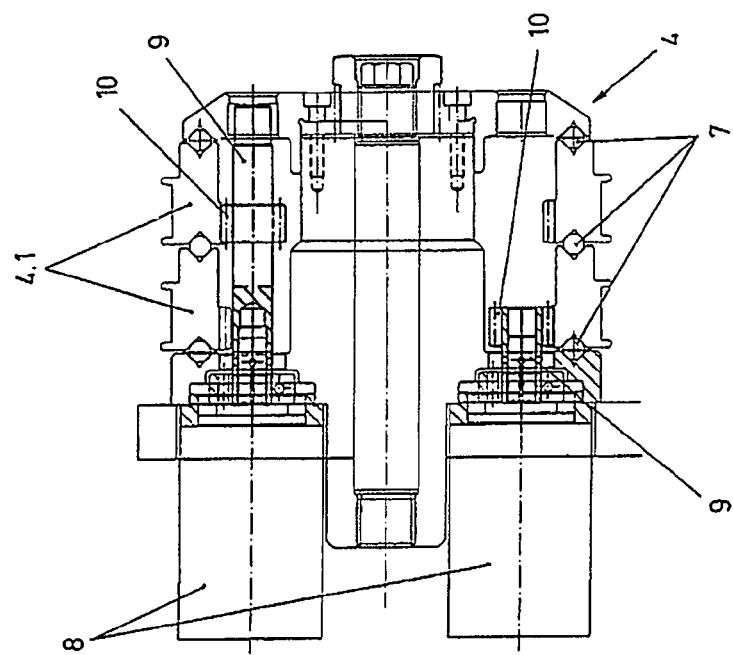
FIG. 4 shows a sectioned view of a master roller for pulling the fiber strips towards the application area.

The master rollers (4) are formed by a set of rollers (4.1) arranged in axial assembly, as shown in FIGS. 4 to 6, said rings (4.1) going separately to one another by means of balls (7), such that the different rings (4.1) are rotationally independent like the parts of a bearing.

The rings (4.1) forming each master roller (4) are actuated independently in a rotating actuation by means of respective motors (8), from which they extend through the inside of the roller (4) with respect to shafts (9) establishing, by means of pinions (10), a gearing with the corresponding rings (4.1) for the individual actuation of the latter.

In this way, each ring (4.1) of the master rollers (4) corresponds to the area for the passage of the fiber strips (1) towards the application area, allowing to actuate, in contact with the corresponding dolly roller (11), the pulling of the respective strip (1), so as to provide it with the speed required by the process.

Said rings (4.1) of the master rollers have recesses (12) in the periphery, such that according to the peripheral area facing the dolly roller (11), the corresponding strip (1) is trapped or does not enter the ring (4.1) and the dolly roller (11), allowing to give an acceleration or deceleration to the strip (1) when it is trapped and leaving it free from passage when the areas in which the trapping is not carried out coincide.

In the feed process of the fiber strips (1), the latter are led to the application area (2) where they are pressed by a pressure system against the surface to be taped, such that in a first feed phase the strips (1) are pulled towards the application area (2) by the corresponding rings (4.1) of the master rollers (4), which give the strips (1) the necessary acceleration for the application speed, later being pulled by the movement itself of the head, thanks to the application pressure, leaving the rings (4.1) free.

The pressure system acting on the fiber strips (1) in the application area (2) consists of a roller (13) of flexible material capable of adapting to the surface on which the fiber strips (1) are applied, said roller being actuated by two cylinders exerting a floating pressure, whereby a perfectly uniform application of the fiber strips (1) is achieved.

Figure 9:
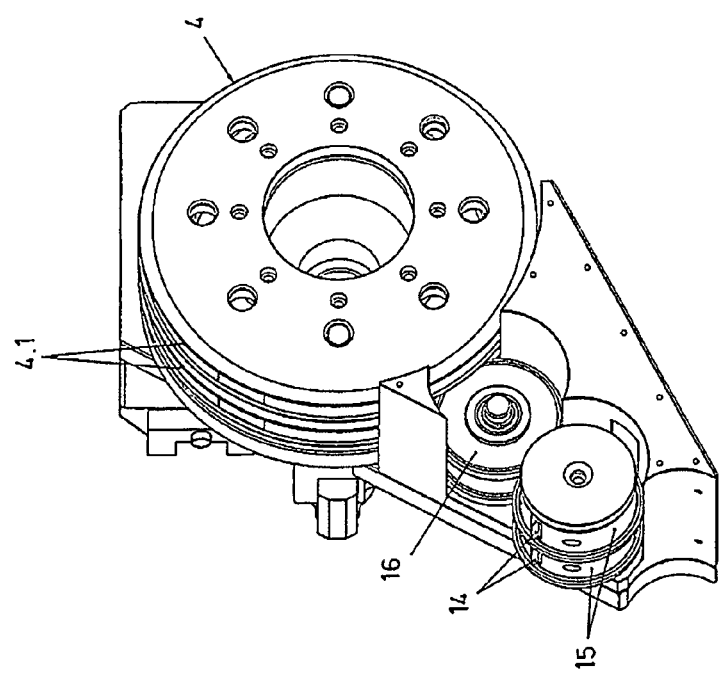
FIG. 9 shows a perspective view of a part of the functional assembly like that of the previous figure.
Figure 8:
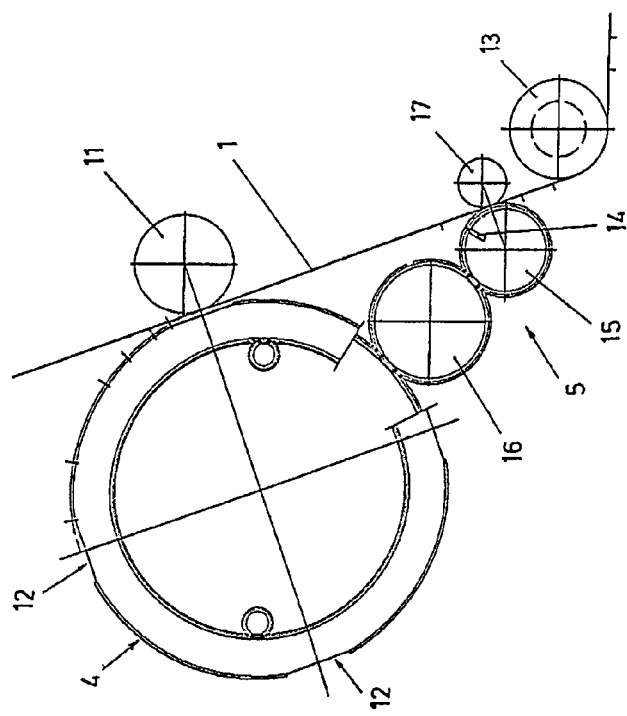
FIG. 8 shows a schematic representation at a larger scale of one of the parts of the mentioned functional assembly of the head.
Figure 10:
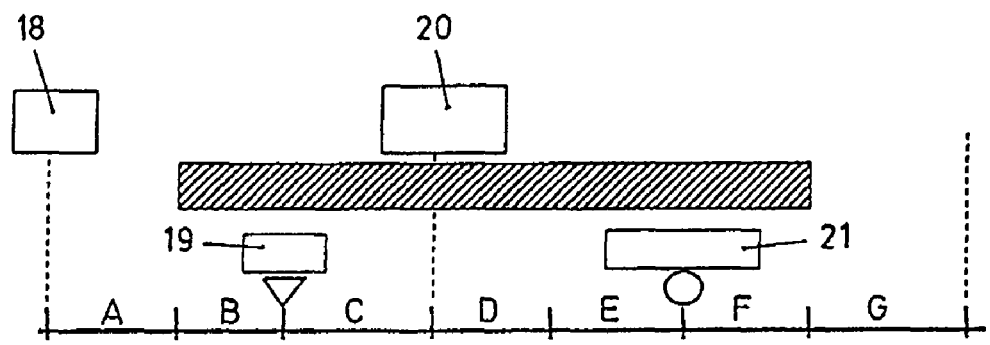
FIG. 10 shows a scheme of the longitudinal development of a fiber strip cutting operation by means of the functional assembly of the head of the invention.
Figure 11:
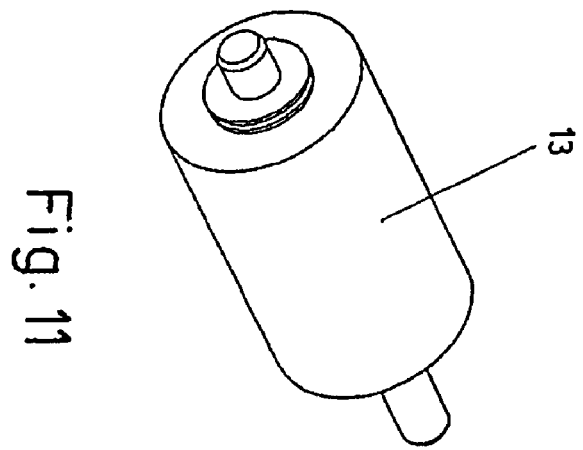
FIG. 11 shows a perspective view of the compacting roller for compacting the fiber strips against the application surface.

The cutting system (5) of each side assembly comprises blades (14) that can act in relation to the areas for the passage of the different fiber strips (1) in the leading to the application area (2), which blades (14) are incorporated in corresponding rotating supports (15), according to FIGS. 9 to 11, such that the rotating support (15) of each blade (14) is connected by means of a rotating coupling (16) to a ring (4.1) of the corresponding master roller (4), whereby each blade (14) is in a synchronized actuation relation with the driving actuation of the corresponding ring (4.1) of the respective master roller (4). The rotating couplings (16) between the supports (15) of the blades (14) and the rings (4.1) of the corresponding master roller (4) can be of any mechanical, hydraulic, electromagnetic type etc. which allows establishing a synchronization.

Dolly rollers (17) are arranged in a position facing the position of the blades (14), in the other side of the area for the passage of the corresponding fiber strips (1), against which dolly rollers the blades (14) act while cutting the fiber strips (1), such that during said cutting, the blades (14) accompany the movement for moving the strip (1) on which the cut is made, thus preventing roughness and tugs and therefore a low cutting quality.

With this arrangement, by means of the rotation of the different supports (15) carrying the corresponding blades (14) to the different areas for the passage of the fiber strips (1), the cutting of each strip (1) can be actuated when the application of the latter must be interrupted, either at the end of each application run or in intermediate areas which must be application-free, allowing to make parts with any outline and with hollows or windows in a continuous work process and with a minimum waste of material, without needing to reduce the work speed, thus increasing the productivity.

To that end, it is only necessary to arrange the recesses (12) of the rings (4.1) of the master rollers (4) and the respective blade (14) of the cutting system (5) in a suitable relative angular position, whereby a start-cut-stop process of each fiber strip (1) is achieved by means of a programmed controlling of the rotating actuation of the rings (4.1).

Due to the fact that the rotating supports (15) of the blades (14) are connected to the corresponding rings (4.1) by means of the couplings (16), there is a perfect synchronism between them, it being foreseen that each ring (4.1) has a size that is n-times the size of the support (15) carrying the respective blade (14) of the cutting system (5), such that n start-cut-restart processes can occur with a complete rotation of the ring (4.1).

Figure 12:
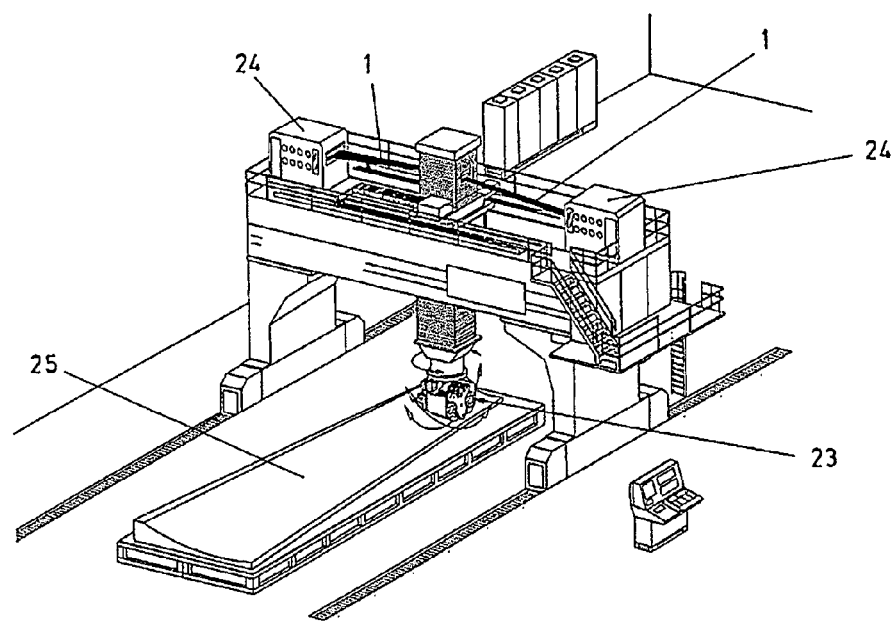
FIGS. 12 and 13 show two examples of the practical application of the object of the invention.
Figure 13:
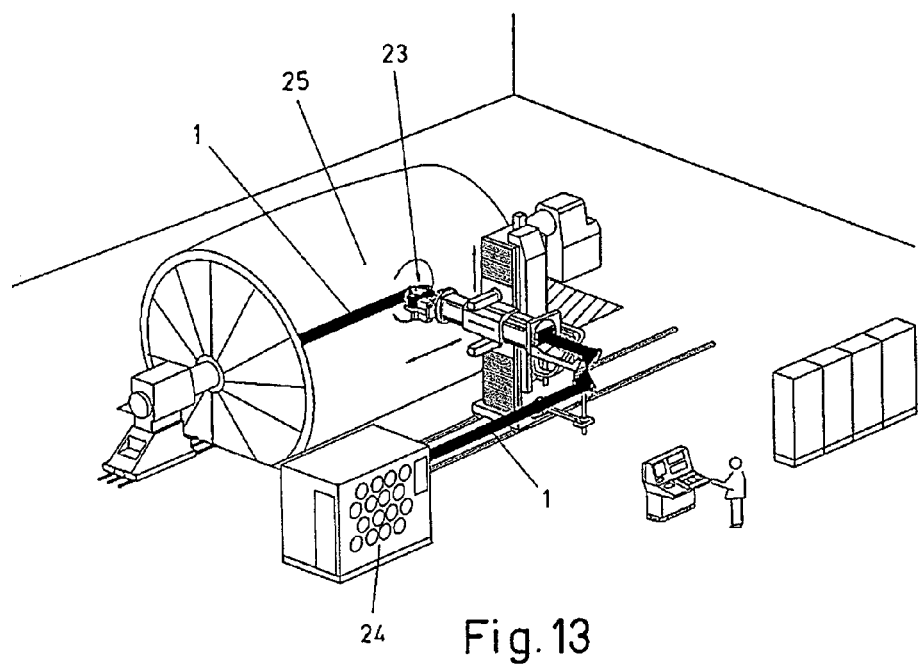

The development of the rotating support (15) of a cutting blade (14) is equivalent to a length like the one represented in FIG. 12, where areas A, B, C, D, E, F, G represent the different phases of the process for making a cut.

Said length of the development of the support (15) of the blade (14) is equivalent to the minimum length of the strip (1) to be cut, in order to make the cut, corresponding to the different areas of the following phases:

AREA A: in which when the cutting command (18) is received, the ring (4.1) is actuated with a rotating speed corresponding to the movement speed of the fiber strip (1) to be cut.

AREA B: in which the rotation of the ring (4.1) makes the fiber strip (1) be trapped between a non-recessed area of the periphery of said ring (4.1) and the corresponding dolly roller (11), the rotation of the support (15) of the blade (14) occurring at the same time, whereby the blade reaches the fiber strip (1), making the cut (19) thereof against the corresponding dolly roller (17), the blade (14) accompanying the strip (1) in its movement during the cut.

AREA C: in which once the strip (1) has been cut, the latter decelerates by means of the ring (4.1) until it stops, changing the gear of the motor (8) for actuating the mentioned ring (4.1), whereas the front part of the cut strip (1) is pulled by the progress itself of the application process until it is deposited and compacted on the application surface.

AREA D: in which when the restart command (20) is received, the ring (4.1) is actuated again to pull the strip (1) and accelerate it to the supply speed for the application process.

AREA E: in which once the necessary speed is reached, the strip (1) is led to the application area (2).

AREA F: in which the strip (1) again reaches the application area (2), a distance imposed by the taping process itself being maintained therein so as to ensure a correct compaction (21) on the application surface.

AREA G: which returns to the initial state of the process to continue the application of the strip (1).

In the side assemblies carrying the master rollers (4) and the corresponding cutting systems (5), there are slides (22) which can move on guides, allowing the movement of each of these side assemblies towards the outside of the body (3), which facilitates the maintenance and/or cleaning actions which are to be carried out, as well as the threading of the fiber strips (1) through the corresponding hollows for the passage towards the application area (2).

The invention claimed is:

1. A fiber strip multiapplicator head, comprising:
rollers serving as a guiding for the respective strips (1) which are led individually towards an application area (2) where they are compacted by a pressure system; and
pulling means for the movement of the strips and a selective cutting system for the cutting thereof going arranged in relation to the area for the passage of the strips (1),
the guiding rollers being distributed in respective side assemblies, from which the strips (1) are led through hollows defined by the structural formation of a body (3),
the strips being pulled by means of a master roller (4) located in the upper part of the head, said roller being synchronized with a cutting system (5) formed by blades (14) arranged in respective rotating supports (15) by means of mechanical or computer synchronism system,
whereas in relation to an application area (2) of the strips (1) there is included a pressure system formed by a compacting roller (13) manufactured with a flexible material adapting to the surface to be taped,
characterized in that the master rollers (4) are formed by rings (4.1), wherein said rings have recesses (12) in the periphery, determining areas of the outline which allow actuating the pulling of the fiber strips (1) in contact with a dolly roller (11) and areas leaving the passage of said fiber strips (1) towards the application area (2) free.

2. A fiber strip multiapplicator head according to claim 1, characterized in that the cutting system (5) of each side assembly consists of blades (14) arranged in respective rotating supports (15), corresponding to the areas for the passage of the different fiber strips (1), which supports (15) of the blades (14) are individually connected by means of any synchronism method to the respective rings (4.1) of the corresponding master rollers (4), allowing to carry out cycles for cutting the fiber strips (1) in combination with the movement of the latter.

3. A fiber strip multiapplicator head according to claim 1, characterized in that the body (3) is formed by a structure of parallel sheets with intermediate dividers (6) between them, the separation spaces between the component sheets determining the hollows for leading the fiber strips (1) towards the application area (2), while the dividers (6) are provided with holes allowing an injection of lubricating air so as to reduce the friction between the strips (1) in the leading.

4. A method for applying the fibers by means of the multiapplicator system described in claim 1, consisting of the following sequence of operations for each complete cycle for cutting/restarting each strip:

starting from the position in which the tape moves forward freely through the head to the compacting roller, the master roller is accelerated until reaching the synchronism speed with the forward movement of the tape (acceleration phase (A)), at which time the master roller traps the tape according to its larger diameter in this area (trapped tape phase (B));

with the tape trapped by the master roller, the synchronized movement of the cutting mechanism cuts the tape, after which the deceleration occurs until stopping the forward movement of the part of the tape trapped in the master roller (deceleration phase (C)), whereas the restart of the tape occurs by accelerating the master roller with the trapped tape (acceleration phase (D)) until reaching the speed of the forward movement of the head on the part, dispensing tape at said speed until the contact of the end thereof with the compacting element (phase of feed to roller (E)) plus a safety distance for ensuring the correct adherence of the end of the tape to the taped surface (interpolated distance (F)), after which the master roller releases the tape according to its smaller diameter in this area and decelerates until it stops (deceleration phase (G)), allowing the tape to move forward freely through the head.

5. A method for applying the fibers by means of the multiapplicator system described in claim 2, consisting of the following sequence of operations for each complete cycle for cutting/restarting each strip:

starting from the position in which the tape moves forward freely through the head to the compacting roller, the master roller is accelerated until reaching the synchronism speed with the forward movement of the tape (acceleration phase (A)), at which time the master roller traps the tape according to its larger diameter in this area (trapped tape phase (B));

with the tape trapped by the master roller, the synchronized movement of the cutting mechanism cuts the tape, after which the deceleration occurs until stopping the forward movement of the part of the tape trapped in the master roller (deceleration phase (C)), whereas the restart of the tape occurs by accelerating the master roller with the trapped tape (acceleration phase (D)) until reaching the speed of the forward movement of the head on the part, dispensing tape at said speed until the contact of the end thereof with the compacting element (phase of feed to roller (E)) plus a safety distance for ensuring the correct adherence of the end of the tape to the taped surface (interpolated distance (F)), after which the master roller releases the tape according to its smaller diameter in this area and decelerates until it stops (deceleration phase (G)), allowing the tape to move forward freely through the head.

6. A method for applying the fibers by means of the multiapplicator system described in claim 3, consisting of the following sequence of operations for each complete cycle for cutting/restarting each strip:

starting from the position in which the tape moves forward freely through the head to the compacting roller, the master roller is accelerated until reaching the synchronism speed with the forward movement of the tape (acceleration phase (A)), at which time the master roller traps the tape according to its larger diameter in this area (trapped tape phase (B));

with the tape trapped by the master roller, the synchronized movement of the cutting mechanism cuts the tape, after which the deceleration occurs until stopping the forward movement of the part of the tape trapped in the master roller (deceleration phase (C)), whereas the restart of the tape occurs by accelerating the master roller with the trapped tape (acceleration phase (D)) until reaching the speed of the forward movement of the head on the part, dispensing tape at said speed until the contact of the end thereof with the compacting element (phase of feed to roller (E)) plus a safety distance for ensuring the correct adherence of the end of the tape to the taped surface (interpolated distance (F)), after which the master roller releases the tape according to its smaller diameter in this area and decelerates until it stops (deceleration phase (G)), allowing the tape to move forward freely through the head.

* * * * *